United States Patent
Sueyoshi

(10) Patent No.: US 7,256,945 B2
(45) Date of Patent: Aug. 14, 2007

(54) ZOOM LENS AND IMAGE PICK-UP APPARATUS

(75) Inventor: Masafumi Sueyoshi, Kanagawa (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 11/146,088

(22) Filed: Jun. 7, 2005

(65) Prior Publication Data
US 2005/0275948 A1    Dec. 15, 2005

(30) Foreign Application Priority Data
Jun. 14, 2004    (JP) ............................. 2004-175235

(51) Int. Cl.
*G02B 15/14*    (2006.01)
(52) U.S. Cl. ...................... 359/676; 359/683; 359/684; 359/764
(58) Field of Classification Search ................ 359/676, 359/683, 684, 764, 678, 694, 695, 757, 758
See application file for complete search history.

(56) References Cited

U.S. PATENT DOCUMENTS

| | | | | |
|---|---|---|---|---|
| 5,285,316 A | * | 2/1994 | Miyano et al. | ............. 359/684 |
| 5,546,230 A | * | 8/1996 | Sato et al. | ................... 359/684 |
| 5,751,496 A | | 5/1998 | Hamano | |
| 5,978,150 A | * | 11/1999 | Hamanishi et al. | ......... 359/683 |
| 2003/0161620 A1 | | 8/2003 | Hagimori et al. | |
| 2005/0007678 A1 | | 1/2005 | Sueyoshi | |

FOREIGN PATENT DOCUMENTS

| | | |
|---|---|---|
| JP | 6-109976 | 4/1994 |
| JP | 8-129202 | 5/1996 |
| JP | 8-248318 | 9/1996 |
| JP | 2000-131610 | 5/2000 |

OTHER PUBLICATIONS

European Search Report; Application No./Patent No.: 05291263.1-1234; Dated: Jan. 2, 2007.

* cited by examiner

*Primary Examiner*—Hung Dang
*Assistant Examiner*—Joseph Martinez
(74) *Attorney, Agent, or Firm*—Rader Fishman & Grauer PLLC; Ronald P. Kananen

(57) ABSTRACT

A zoom lens is proposed, which includes a first lens group having positive refractive power, a second lens group having negative refractive power, a third lens group having positive refractive power, a fourth lens group having positive refractive power, and a fifth lens group having negative refractive power, which are arranged in order from an object side, performing zooming by moving the second lens group and the fourth lens group, wherein the first lens group includes a front lens group having negative refractive power, an optical member refracting a light path, and a rear lens group having positive refractive power, which are arranged in order from the object side, wherein the fourth lens group includes one single lens, and if an image forming power of the fifth lens group at an object distance of infinity is β5, a conditional formula (1) $1.0 < \beta5 < 1.8$ is satisfied.

8 Claims, 7 Drawing Sheets

ZOOM LENS AND IMAGE PICK-UP APPARATUS

CROSS REFERENCE TO RELATED APPLICATION

The present invention contains subject mater related to Japanese Patent Application JP2004-175235 filed in the Japanese Patent Office on Jun. 14, 2004, the entire contents of which are incorporated herein by reference.

BACKGROUND OF THE INVENTION

1. Field of Invention

The present invention relates to a zoom lens and an image pick-up apparatus using the zoom lens as image pick-up lens, and particularly to a rear focus type zoom lens capable of realizing variable power of about 3× to 5× which is suitable for a small size image pick-up apparatus, such as a digital still camera and a home video camera, and to an image pick-up apparatus using the zoom lens.

2. Description of Related Art

In recent years, while a digital still camera and a digital video camera have been widespread for home use, further downsizing has been sought with respect to these small size image pick-up apparatuses. Consequently, with respect to an imaging lens mounted on these apparatuses, particularly with respect to a zoom lens, downsizing by reducing an entire length, a depth thereof and the like also has been sought. Furthermore, with respect to such an imaging lens, particularly for a digital still camera, in addition to downsizing, improvement in lens performance corresponding to a great number of pixels of an image pick-up device has been sought.

As a zoom lens having image forming performance corresponding to a related-art solid-state image pick-up apparatus with a great number of pixels and having a shortened entire length, like a zoom lens shown in Patent Document 1, there is known a four-group zoom lens composed by arranging a first lens group having positive refractive power, a second lens group having negative refractive power, a third lens group having positive refractive power and a fourth lens group having positive refractive power in order from the object side. The zoom lens shown in Patent Literature 1 has a prism refracting a light path arranged in the first lens group for downsizing in an incident optical axis direction to the relevant zoom lens, for what is called a reduction in thickness.

[Patent Document 1] Japanese Patent Application Publication No. 2000-131610

SUMMARY OF THE INVENTION

In a zoom lens having an optical system refracting a light path by using a prism, downsizing of the prism allows further downsizing and a reduction in thickness. However, in order to maintain image forming performance, the zoom lens disclosed in Patent Document 1 requires a certain degree of variable power in the first lens group, which cannot reduce lenses included in the first lens group in diameter and thickness. This disadvantageously makes it difficult to further downsize the prism, thereby leading to difficulty with further downsizing and reducing the thickness of the zoom lens.

The present invention is achieved in light of the above-described problem, and it is desirable to provide a rear focus type zoom lens capable of downsizing an entire lens system thereof by further downsizing an optical member refracting a light path such as a prism without impairing optical performance.

Furthermore, it is desirable to provide an image pick-up apparatus using the rear focus type zoom lens capable of downsizing an entire lens system thereof by downsizing an optical member refracting a light path such as a prism without impairing optical performance.

According to an embodiment of the present invention, there is provided a zoom lens including a first lens group having positive refractive power, a second lens group having negative refractive power, a third lens group having positive refractive power, a fourth lens group having positive refractive power, and a fifth lens group having negative refractive power, which are arranged in order from an object side, to perform zooming by moving the second lens group and the fourth lens group, wherein the first lens group includes a front lens group having negative refractive power, an optical member refracting a light path, and a rear lens group having positive refractive power, which are arranged in order from the object side, wherein the fourth lens group includes one single lens, and if an image forming power of said fifth lens group at an object distance of infinity is set to be $\beta 5$, the following conditional formula (1) $1.0 < \beta 5 < 1.8$ is satisfied.

Furthermore, according to an embodiment of the present invention, there is provided an image pick-up apparatus using as an image pick-up lens a zoom lens, which includes a first lens group having positive refractive power, a second lens group having negative refractive power, a third lens group having positive refractive power, a fourth lens group having positive refractive power, and a fifth lens group having negative refractive power, which are arranged in order from an object side, to perform zooming by moving the second lens group and the fourth lens group, wherein the fourth lens group includes one single lens, and if an image forming power of the fifth lens group at an object distance of infinity is set to be $\beta 5$, a conditional formula (1) $1.0 < \beta 5 < 1.8$ is satisfied.

Accordingly, in the present invention, the optical member refracting the light path located within the first lens group is downsized.

In the zoom lens including a first lens group having positive refractive power, a second lens group having negative refractive power, a third lens group having positive refractive power, a fourth lens group having positive refractive power, and a fifth lens group having negative refractive power, which are arranged in order from the object side and constituted such that moving the second lens group and the fourth lens group enables the zooming, the zoom lens of the present invention is characterized in that the first lens group includes a front lens group having negative refractive power, an optical member refracting a light path, and a rear lens group having positive refractive power, which are arranged in order from the object side, the fourth lens group is composed of one single lens and if image forming power of the fifth lens group at an object distance of infinity is $\beta 5$, a conditional formula (1) is satisfied:

$$1.0 < \beta 5 < 1.8 \qquad (1)$$

Furthermore, in the image pick-up apparatus using as an image pick-up lens a zoom lens including a first lens group having positive refractive power, a second lens group having negative refractive power, a third lens group having positive refractive power, a fourth lens group having positive refractive power, and a fifth lens group having negative refractive power, which are arranged in order from the object side, and constituted such that moving the second lens group and the fourth lens group enables zooming, the image pick-up apparatus of the present invention is characterized in that the first lens group includes a front lens group having negative refractive power, an optical member refracting a light path, and a rear lens group having positive refractive power, which are arranged in order from the object side, the fourth lens group is composed of one single lens, and if an image forming power of the fifth lens group at an object distance of infinity is β5, a conditional formula (1) is satisfied:

$$1.0<\beta5<1.8 \quad (1)$$

Accordingly, in the present invention, since the first lens group includes the front lens group having negative refractive power, the optical member refracting the light path, and the rear lens group having positive refractive power, a moving direction of the second and fourth lens groups when the zooming is performed becomes an optical axis direction of the rear lens group of the first lens group, which reduces the lens system in thickness. In addition, by setting the image forming power β5 of the fifth lens group at the object distance of infinity to larger than 1.0, image forming power of the lens groups relatively on the object side thereof, especially image forming power of the first lens group can be decreased, and effective diameters of the front lens group and the rear lens group of the first lens group can be made smaller. Furthermore, by setting the image forming power β5 of the fifth lens group to smaller than 1.8, even if a F number is reduced, spherical aberration in the fifth lens group can be corrected.

According to an embodiment of the present invention, there is provided a zoom lens in which in the first lens group the front lens group includes one meniscus lens having negative refractive power that is formed into a convex shape toward the object side, the optical member includes a prism, and the rear lens group includes one lens in which both surface thereof are convex surfaces, and if a refractive index of the meniscus lens composing the front lens group with respect to a line d is ndL1 and an Abbe number with reference to the line d is vdL1, conditional formulas (2) ndL1>1.8 and (3) vdL1<30 are satisfied. Consequently, the effective diameter of the first lens of the first lens group, that is, the front lens is, reduced, which enables further downsizing of the prism.

According to an embodiment of the present invention, there is provided, a zoom lens in which by moving the second lens group from the object side to the image surface side and moving the fourth lens group from the image surface side to the object side, zooming from the short focal distance side to the long focal distance side is performed, and if a stroke of the second lens group from a short focal distance end to a long focal distance end is dZ2 and a stroke of the fourth lens group from the short focal distance end to the long focal distance end at the object distance of infinity is dZ4, a conditional formula (4) 0.6<|dZ2/dZ4|<2.0 is satisfied. Consequently, the stroke of the second lens group at the time of zooming is reduced without increasing the effective diameters of the second lens group and the fourth lens group, so that further downsizing of an entire length of the lens system can be achieved.

According to an embodiment of the present invention, there is provided a zoom lens in which at least one negative lens in the second lens group and at least one positive lens in the third lens group and the fourth lens group are made of plastic lenses. Consequently, even in the case of an inexpensive constitution in which plastic lenses comparatively sensitive to temperature variation are used, characteristic variation due to the temperature variation is cancelled between the plastic negative lens and the plastic positive lens, thereby maintaining predetermined performance.

Further features of the invention and the advantages offered thereby are explained in detail hereinafter, with reference to specific embodiments of the invention illustrated in the accompanying drawings.

DESCRIPTION OF THE PREFERRED EMBODIMENTS

Figure 1:
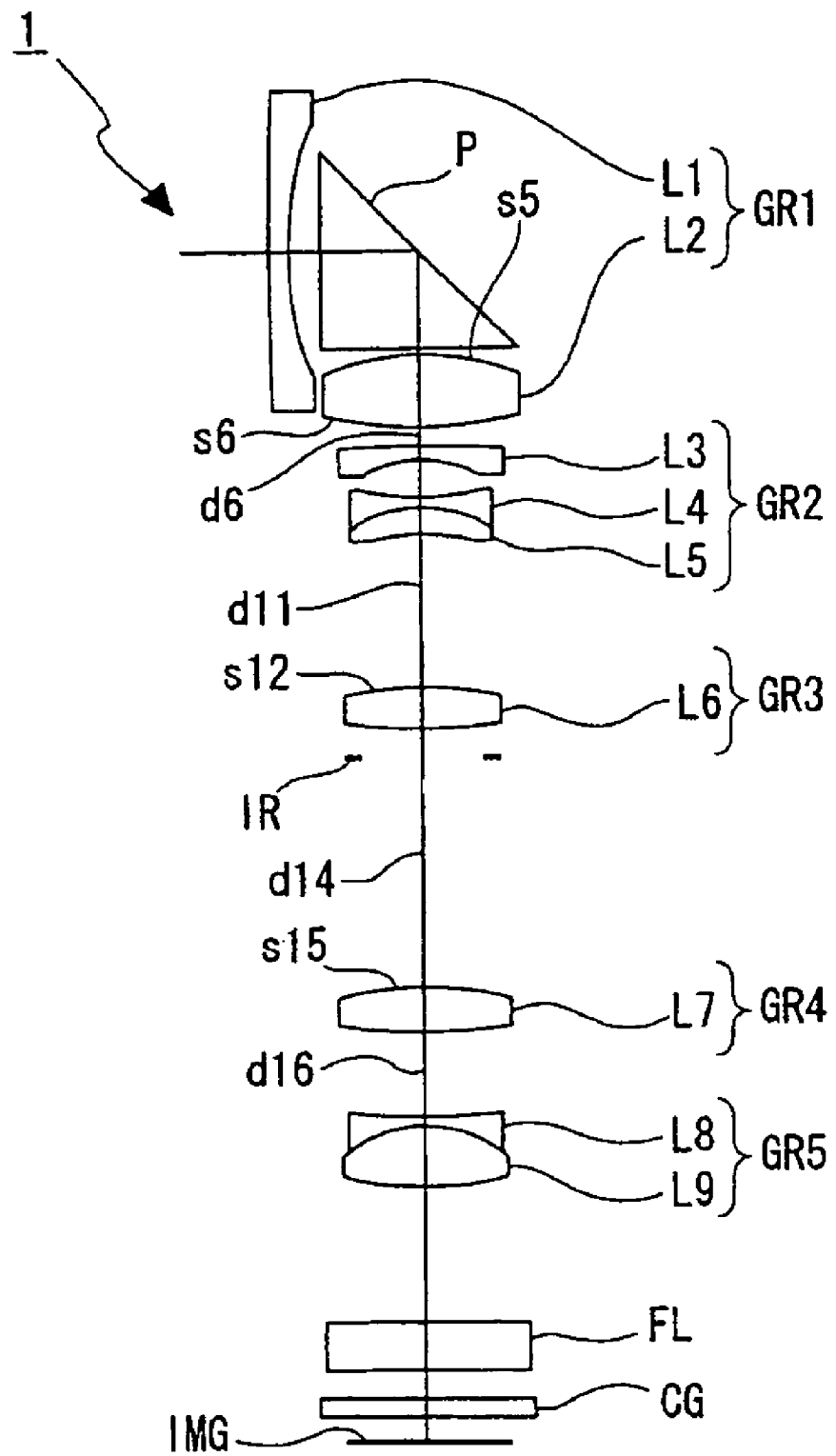
FIG. 1 is a view showing a first embodiment of a zoom lens of the present invention together with FIGS. 2 to 4, in which a lens constitution is illustrated.

Hereinafter, preferred embodiments for carrying out a zoom lens and an image pick-up apparatus of the present invention are described by referring to the accompanying drawings.

The zoom lens of the present invention is composed by arranging a first lens group having positive refractive power, a second lens group having negative refractive power, a third lens group having positive refractive power, a fourth lens group having positive refractive power, and a fifth lens group having negative refractive power in order from the object side, and it is constituted such that moving the second lens group and the fourth lens group enables zooming.

The first lens group includes a front lens group having negative refractive power, an optical member refracting a light path, and a rear lens group having positive refractive power, and the fourth lens group is composed of one single lens.

In addition, if an image forming power of the fifth lens group at an object distance of infinity is β5, the following conditional formula (1) is satisfied.

$$1.0 < \beta 5 < 1.8 \quad (1)$$

In the zoom lens of the present invention as described above, since the light path is refracted by the optical member of the first lens group, a moving direction of the second lens group and the fourth lens group in zooming is an optical axis direction of the rear lens group of the first lens group, and thus a depth, namely a size in the optical axis direction of the front lens group of the first lens group, can be reduced.

The conditional formula (1) defines the image forming power β5 of the fifth lens group at the object distance of infinity. By setting β5 to larger than 1.0, image forming power of the lens groups relatively on the object side of the fifth lens group, particularly that of the first lens group, can be reduced, so that the front lens group and the rear lens group of the first lens group also can be reduced in effective diameter. Thus, by reducing the front lens group and the rear lens group in effective diameter, the optical member for refracting the light path, e.g., the prism, can become smaller, thereby accomplishing a reduction in thickness and downsizing.

However, if the image forming power β5 of the fifth lens group becomes larger than 1.8, and in the case where a F number is designed to be small, it is impossible to sufficiently correct spherical aberration in the fifth lens group. Furthermore, an exit pupil of the fifth lens group becomes close to an image surface IMG, and an angle of light entering an image pick-up device largely deviates from perpendicularity. Consequently, shading or the like occurs, thereby degrading the image forming performance.

On the contrary, if the image forming power β5 is below the lower limit of the conditional formula (1), it becomes difficult to reduce, particularly, the front lens group of the first lens group in effective diameter.

In the first lens group, it is preferable that the front lens group is composed of one meniscus lens having a negative refractive power that is formed into a convex shape toward the object side and the optical member is made of a prism, and the rear lens group is composed of one lens whose both surfaces are convex surfaces. By constituting the first lens group in this manner, the effective diameter of the front lens group can become smaller, which can further downsize the optical member for refracting the light path. In this case, if a refractive index with respect to a line d of the meniscus lens composing the front lens group is ndL1, an Abbe number with reference to the line d is vdL1, and it is preferable that the following formulae (2) and (3) are satisfied.

$$ndL1 > 1.8 \quad (2)$$

$$vdL1 < 30 \quad (3)$$

Here, satisfying the condition of the conditional formula (2) allows the correction of spherical aberration in the first lens group to be easily performed. Furthermore, satisfying the condition of the conditional formula (3) allows the correction of chromatic aberration in the first lens group to be easily performed.

In the zoom lens of the present invention, as described above, since the image forming power of the fifth lens group is comparatively large, when zooming from a short focal distance end to a long focal distance end is performed, a moving direction of the respective moving lens groups can be one direction. More specifically, by moving the second lens group from the object side to the image surface side and by moving the fourth lens group from the image surface side to the object side, the zooming from the short focal distance end to the long focal distance end is enabled. In this zoom lens, since a constitution in which, mainly, the movement of the fourth lens group varies the variable power ratio is employed, a stroke of the second lens group can be relatively small. Accordingly, even in the case where the fourth lens group is designed to move in one direction at the time of zooming, the entire length of the optical system does not become particularly longer.

If the stroke of the second lens group from the short focal distance end to the long focal distance end is dZ2 and a stroke of the fourth lens group from the short focal distance end to the long focal distance end at an object distance of infinity is dZ4, it is desirable to establish the following conditional formula (4) between the respective strokes of the second lens group and the fourth lens group at the time of zooming.

$$0.6 < |dZ2/dZ4| < 2.0 \quad (4)$$

If |dZ2/dZ4| is below the lower limit in the conditional formula (4), there arises a necessity for increasing the effective diameter of the fourth lens group, and thus the thickness of the entire lens system is increased. Furthermore, if |dZ2/dZ4| is over the upper limit of the condition formula (4), there arises a necessity for increasing the effective diameters of the first lens group and the second lens group, which similarly increases the thickness of the entire lens system.

Furthermore, in the zoom lens of the present invention, it is preferable that at least one negative lens of the second lens group and at least one positive lens of the third lens group and the fourth lens group are plastic lenses. With this constitution, even in the case of an inexpensive constitution in which plastic lenses comparatively sensitive to temperature variation are used, characteristic variation due to temperature variation is cancelled between the plastic negative lens and the plastic positive lens, so that the desired performance can be maintained.

Furthermore, in the zoom lens of the present invention, using an aspherical surface as needed enables easier correction of various aberrations and brings about higher image forming performance. Particularly, it is effective to form at least one surface of the lenses composing the first lens group into an aspherical surface.

Embodiments of the zoom lens of the present invention and numeric value examples applying concrete numeric values to the embodiments are now described.

FIGS. 1 to 4 show a first embodiment of the zoom lens of the present invention. FIG. 1 is a view showing a lens constitution of a zoom lens 1 according to the first embodiment. This zoom lens 1 is used as an image pick-up lens for an image pick-up apparatus such as a digital still camera, for example.

In the zoom lens 1, there are arranged a first lens group GR1 having positive refractive power, a second lens group GR2 having negative refractive power, a third lens group GR3 having positive refractive power, a fourth lens group GR4 having positive refractive power and a fifth lens group GR5 having negative refractive power in order from the object side to the image surface IMG side. Furthermore, on the image surface IMG side of the third lens group GR3, an iris IR adjusting an amount of light is arranged, and on the image surface IMG side of the fifth lens group GR5, a filter FL made of a low-pass filter or the like, such as an infrared ray cut filter and a cover glass CG of the image pick-up device are arranged. The image surface IMG is a light receiving surface of the image pick-up device such as a CCD (Charge Coupled Device), for example.

This zoom lens 1 is constituted so as to move the second lens group GR2 and the fourth lens group GR4 for zooming. When the zooming from the short focal distance end to the long focal distance end is performed, the second lens group GR2 is moved from the object side to the image surface IMG side, and the fourth lens group GR4 is moved from the image surface IMG side to the object side, respectively. Furthermore, a so-called rear focus system is employed for this zoom lens 1 and thus moves the fourth lens group GR4, or the fifth lens group GR5 enables focusing.

Furthermore, the first lens group GR1 is composed of one lens L1 having negative refractive power, a prism P for refracting a light path, and one lens L2 having positive refractive power in order from the object side. Accordingly, a moving direction of the lenses moved at the time of zooming and focusing is an optical axis direction of the lens L2, different from an optical axis direction of the lens L1 which is the closest to the object. In the present embodiment, the lens L1 is made of a meniscus lens formed into a convex shape toward the object side, and the lens L2 is made of a plastic aspherical lens in which both lens surfaces are formed into a convex shape.

Furthermore, the second lens group GR2 is composed of three lenses L3, L4 and L5 arranged in order from the object side, and lens surfaces between the lens L4 and the lens L5 are cemented. The third lens group GR3 is composed of one lens L6. The fourth lens group GR4 is composed of one lens L7. Furthermore, the fifth lens group GR5 is composed of two lenses L8 and L9, and lens surfaces between the lens L8 and the lens L9 are cemented.

Table 1 shows respective numeric values of a numeric value example 1 applying concrete numeric values to the zoom lens 1 according to the first embodiment. In the table, "si" denotes an i-th surface from the object side among light entrance surfaces and outgoing surfaces in a central axis of the lenses L1 to L10, the prism P, the iris (aperture stop) IR, the filter FL, and the cover glass CT, "ri" denotes a curvature radius of the i-th surface from the object, "di" denotes a surface distance between the i-th surface and an (i+1)-th surface, "ni" denotes a refractive index with respect to the line d ($\lambda$=587.6 nm) of an i-th glass material from the object, and "vi" denotes an Abbe number with respect to the line d of the i-th glass material from the object side, respectively. Furthermore, "INFINITY" indicates that the relevant surface is a plane surface, and "ASP" indicates that the relevant surface is an aspherical surface. The cementing surfaces among the above-mentioned respective surfaces are indicated by the same surface number.

TABLE 1

| si | ri | di | ni | vi |
|----|----|----|----|----|
| 1  | r1 = 155.186      | d1 = 0.70       | n1 = 1.922860 | v1 = 20.88 |
| 2  | r2 = 12.807       | d2 = 1.20       |               |            |
| 3  | r3 = INFINITY     | d3 = 7.80       | n2 = 1.835000 | v2 = 42.98 |
| 4  | r4 = INFINITY     | d4 = 0.30       |               |            |
| 5  | r5 = 8.396(ASP)   | d5 = 2.55       | n3 = 1.524700 | v3 = 56.24 |
| 6  | r6 = −14.471(ASP) | d6 = variable   |               |            |
| 7  | r7 = 52.128       | d7 = 0.50       | n4 = 1.835000 | v4 = 42.98 |
| 8  | r8 = 5.189        | d8 = 1.188      |               |            |
| 9  | r9 = −10.880      | d9 = 0.45       | n5 = 1.683321 | v5 = 56.70 |
| 10 | r10 = 4.458       | d10 = 1.08      | n6 = 1.841061 | v6 = 39.49 |
| 11 | r11 = 16.459      | d11 = variable  |               |            |
| 12 | r12 = 11.430(ASP) | d12 = 1.462     | n7 = 1.693500 | v7 = 53.20 |
| 13 | r13 = −20.000     | d13 = 1.00      |               |            |
| 14 | r14 = INFINITY    | d14 = variable  |               | Aperture Stop |
| 15 | r15 = 10.594      | d15 = 1.57      | n8 = 1.583129 | v8 = 59.46 |
| 16 | r16 = −17.548(ASP)| d16 = variable  |               |            |
| 17 | r17 = −32.177     | d17 = 0.50      | n9 = 1.850000 | v9 = 23.50 |
| 18 | r18 = 4.539       | d18 = 2.05      | n10 = 1.546235| v10 = 64.52 |
| 19 | r19 = −14.532     | d19 = 6.63      |               |            |
| 20 | r20 = INFINITY    | d20 = 1.70      | n11 = 1.552320| v11 = 63.42 |
| 21 | r21 = INFINITY    | d21 = 1.00      |               |            |
| 22 | r22 = INFINITY    | d22 = 0.50      | n12 = 1.516798| v12 = 64.20 |
| 23 | r23 = INFINITY    | d23 = 0.99      |               |            |
| 24 | r24 = INFINITY    |                 |               | Image Surface (IMG) |

In the zoom lens 1, during zooming, a surface distance d6 between the first lens group GR1 and the second lens group GR2, a surface distance d11 between the second lens group GR2 and the third lens group GR3, a surface distance d14 between the iris IR and the fourth lens group GR4, and a surface distance d16 between the fourth lens group GR4 and the fifth lens group GR5 are variable. In Table 2, respective values of the respective surface distances d6, d11, d14 and d16 at the short focal distance end, at an intermediate focal distance between the short focal distance end and the long focal distance end, and at the long focal distance end according to the numeric value example 1 are shown together with focal distances, F numbers and half angles of field ω (degree).

TABLE 2

|  | Focal Distance | | |
| --- | --- | --- | --- |
|  | 6.18 | 10.40 | 17.49 |
| F Number | 3.88 | 4.20 | 5.10 |
| ω (degree) | 29.3 | 17.6 | 10.5 |
| d6 | 0.70 | 3.63 | 5.43 |
| d11 | 5.43 | 2.51 | 0.70 |
| d14 | 8.35 | 5.55 | 2.36 |
| d16 | 2.98 | 5.79 | 8.98 |

In the zoom lens 1, both of the surfaces of lens L2 (s5 and s6), a surface of the lens L6 on the object side (s12), and a surface of the lens L7 on the image surface side (s16) are formed into aspherical surfaces. The shape of each of the aspherical surfaces is expressed by the following expression.

$$x = y^2/r/(1+(1-\kappa \cdot y^2/r^2)^{1/2}) + C4 \cdot y^4 + C6 \cdot y^6 + C8 \cdot y^8 + C10 \cdot y^{10} \quad (1)$$

In the above expression, a distance in the optical axis direction from a top of each lens surface is x, a curvature radius of the lens at the top is r and a conic constant is κ. Furthermore, 4th-order, 6th-order, 8th-order, and 10th-order aspherical surface coefficients are C4, C6, C8 and C10, respectively. In Table 3, the 4th-order, 6th-order, 8th-order, and 10th-order aspherical surface coefficients C4, C6, C8 and C10 in the respective surfaces s5, s6, s12 and s16 are shown together with the conic constants κ. "E" in Table 3 (similar to Tables 6 and 9 described later) denotes an exponential notation with a base 10.

TABLE 3

| si | κ | C4 | C6 | C8 | C10 |
| --- | --- | --- | --- | --- | --- |
| 5 | 0 | −.243475E−03 | 0.000000E+00 | 0.000000E+00 | 0.000000E+00 |
| 6 | 0 | 0.141703E−03 | 0.378581E−05 | −.134346E−06 | 0.300699E−08 |
| 12 | 0 | −.301361E−03 | −.263572E−05 | −.173829E−06 | 0.373133E−07 |
| 15 | 0 | 0.306284E−03 | 0.516207E−06 | −.502485E−06 | 0.505476E−07 |

As shown in this numeric value example 1, by forming into an aspherical surface at least one lens surface of the lenses that the first lens group GR1 includes, distortion aberration is corrected and the effective diameter of the lens L1 is reduced, thereby downsizing the prism P. Furthermore, in the fifth lens group GR5, by forming the cementing surfaces between the lens L9 and the lens L10 into a convex surface on the object side, chromatic aberration is corrected and sensitivity of the fifth lens group GR5 with respect to degradation of lens performance can be reduced. By using the cemented lenses, turbulence of the image surface due to eccentricity within the relevant lens group can be reduced and manufacturing can become easier.

Figure 2:
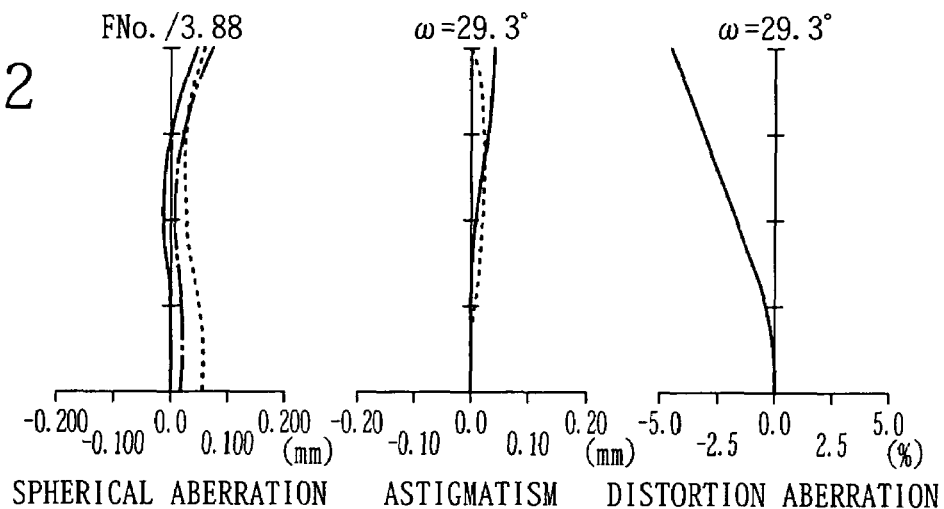
FIG. 2 is charts showing spherical aberration, astigmatism and distortion aberration of a numeric value example 1 applying concrete numeric values to the first embodiment together with FIGS. 3 and 4, in which these aberrations at a short focal distance end are shown.
Figure 3:
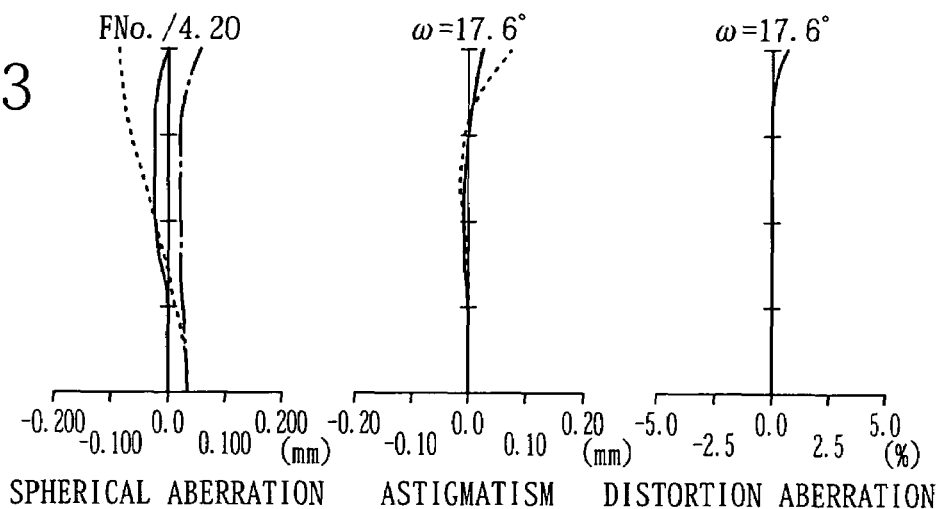
FIG. 3 is charts showing spherical aberration, astigmatism and distortion aberration at an intermediate focal distance between the short focal distance end and a long focal distance end.
Figure 4:
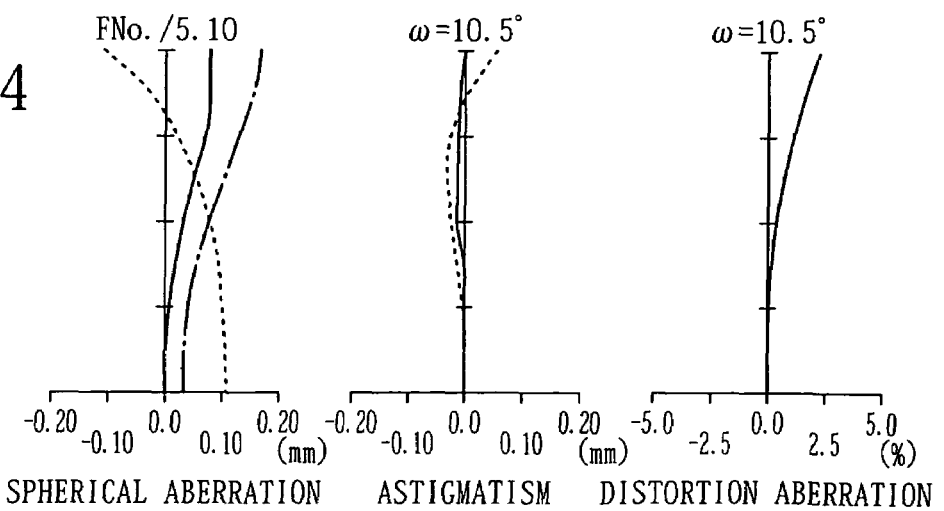
FIG. 4 is charts showing spherical aberration, astigmatism and distortion aberration at the long focal distance end.

FIGS. 2 to 4 are graphs showing various aberrations at the short focal distance end, at the intermediate focal distance, and at the long focal distance end.

Here, in each of the figures, a graph (A) shows spherical aberration with the ordinate indicating a ratio with respect to an open F number and with the abscissa indicating a focus amount. Furthermore, a solid line indicates spherical aberration at a line d (wavelength 587.6 nm), a short dashed line indicates spherical aberration at a line g (wavelength 435.8 nm), and a dashed line shows spherical aberration at a line C (656.3 nm), respectively. Furthermore, a graph (B) in each of the figures shows astigmatism with the ordinate indicating an image height and with the abscissa indicating a focus amount. A solid line indicates values at a sagittal image surface and a short dashed line indicates values at a meridional image surface. Furthermore, a graph (C) in each of the figures shows distortion aberration, with the ordinate indicating an image height and the abscissa indicating a percentage (%) (similar in FIGS. 6 to 8 and FIGS. 10 to 12 described later).

Figure 5:
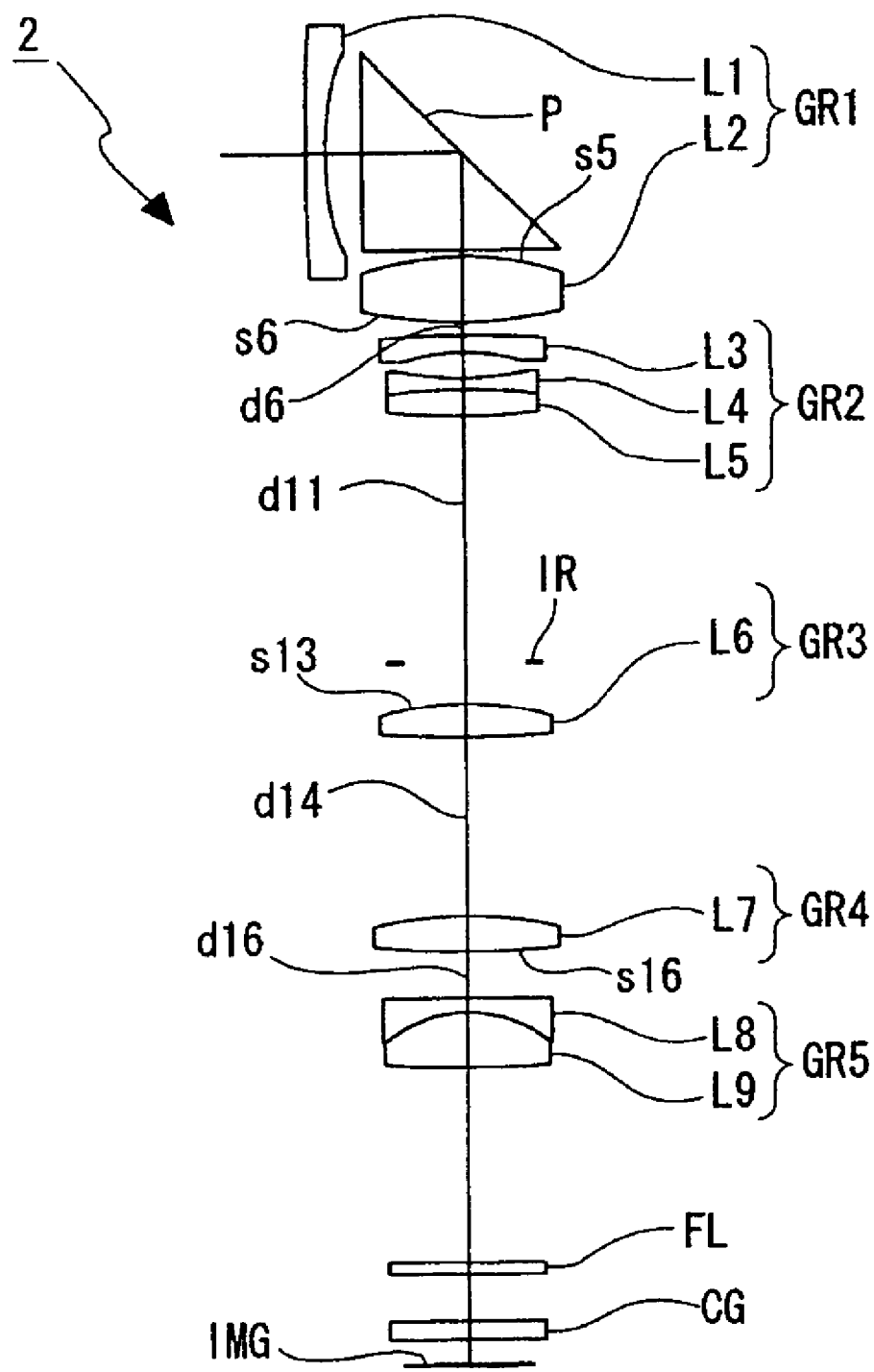
FIG. 5 is a view showing a second embodiment of the zoom lens of the present invention together with FIGS. 6 to 8, in which a lens constitution is illustrated.

FIGS. 5 to 8 show a second embodiment of the zoom lens of the present invention. FIG. 5 is a view showing a lens constitution of a zoom lens 2 according to the second embodiment. This zoom lens 2 also is used as an image pick-up lens for an image pick-up apparatus such as a digital still camera, for example.

In the zoom lens 2, there are arranged a first lens group GR1 having positive refractive power, a second lens group GR2 having negative refractive power, a third lens group GR3 having positive refractive power, a fourth lens group GR4 having positive refractive power and a fifth lens group GR5 having negative refractive power in order from the object side to the image surface IMG side. Furthermore, on the object side of the third lens group GR3, an iris IR adjusting an amount of light is arranged, and on the image surface IMG side of the fifth lens group GR5, a filter FL made of a low-pass filter or the like, such as an infrared ray cut filter, and a cover glass CG of the image pick-up device are arranged. The image surface IMG is a light receiving surface of the image pick-up device such as a CCD (Charge Coupled Device), for example.

This zoom lens 2 is constituted so as to move the second lens group GR2 and the fourth lens group GR4 for zooming. When the zooming from a short focal distance end to a long focal distance end is performed, the second lens group GR2 is moved from the object side to the image surface IMG side, and the fourth lens group GR4 is moved from the image surface IMG side to the object side, respectively. Furthermore, a so-called rear focus system is employed for this zoom lens 2 and thus moved the fourth lens group GR4, or the fifth lens group GR5 enables focusing.

Furthermore, the first lens group GR1 is composed of one lens L1 having negative refractive power, a prism P for refracting a light path, and one lens L2 having positive refractive power in order from the object side. Accordingly, a moving direction of the lenses moved at the time of zooming and focusing is an optical axis direction of the lens L2, which is different from an optical axis direction of the lens L1 which is the closest to the object. In the present embodiment, the lens L1 is made of a meniscus lens formed into a convex shape toward the object side, and the lens L2 is made of a both surface aspherical lens in which both lens surfaces are formed into a convex shape.

Furthermore, the second lens group GR2 is composed of three lenses L3, L4 and L5 arranged in order from the object side, and lens surfaces between the lens L4 and the lens L5 are cemented. The third lens group GR3 is composed of one lens L6. The fourth lens group GR4 is composed of one lens L7. Furthermore, the fifth lens group GR5 is composed of two lenses L8 and L9, and lens surfaces between the lens L8 and the lens L9 are cemented. The lens L6 is a plastic lens whose surface on the object side is an aspherical surface, and the lens L7 is a plastic lens whose surface on the image surface side is an aspherical surface.

Table 4 shows respective numeric values of a numeric value example 2 applying concrete numeric values to the zoom lens 2 according to the second embodiment.

In the zoom lens 2, during zooming, a surface distance d6 between the first lens group GR1 and the second lens group GR2, a surface distance d11 between the second lens group GR2 and the iris IR, a surface distance d14 between the third lens group GR3 and the fourth lens group GR4, and a surface distance d16 between the fourth lens group GR4 and the fifth lens group GR5 are variable. In Table 5, respective values of the respective surface distances d6, d11, d14 and d16 at the short focal distance end, at an intermediate focal distance between the short focal distance end and the long focal distance end, and at the long focal distance end according to the numeric value example 2 are shown together with focal distances, F numbers and half angles of field ω (degree).

TABLE 5

|  | Focal Distance | | |
|---|---|---|---|
|  | 6.18 | 10.40 | 17.49 |
| F Number | 3.80 | 3.93 | 4.14 |
| ω (degree) | 29.4 | 17.5 | 10.5 |
| d6 | 0.50 | 4.80 | 8.31 |
| d11 | 8.81 | 4.51 | 1.00 |
| d14 | 6.52 | 4.69 | 3.16 |
| d16 | 1.80 | 3.63 | 5.16 |

TABLE 4

| si | ri | di | ni | vi |
|---|---|---|---|---|
| 1 | r1 = 52.704 | d1 = 0.65 | n1 = 1.846663 | v1 = 23.78 |
| 2 | r2 = 8.834 | d2 = 1.40 | | |
| 3 | r3 = INFINITY | d3 = 7.00 | n2 = 1.846663 | v2 = 23.78 |
| 4 | r4 = INFINITY | d4 = 0.30 | | |
| 5 | r5 = 12.844(ASP) | d5 = 2.26 | n3 = 1.693500 | v3 = 53.20 |
| 6 | r6 = −15.965(ASP) | d6 = variable | | |
| 7 | r7 = 46.540 | d7 = 0.50 | n4 = 1.835000 | v4 = 42.98 |
| 8 | r8 = 7.227 | d8 = 0.92 | | |
| 9 | r9 = −9.628 | d9 = 0.45 | n5 = 1.696802 | v5 = 55.46 |
| 10 | r10 = 15.221 | d10 = 0.89 | n6 = 1.846663 | v6 = 23.78 |
| 11 | r11 = −80.741 | d11 = variable | | |
| 12 | r12 = INFINITY | d12 = 1.50 | | Aperture Stop |
| 13 | r13 = 8.150(ASP) | d13 = 1.28 | n7 = 1.524700 | v7 = 56.24 |
| 14 | r14 = −50.034 | d14 = variable | | |
| 15 | r15 = 13.216 | d15 = 1.26 | n8 = 1.524700 | v8 = 56.24 |
| 16 | r16 = −25.508(ASP) | d16 = variable | | |
| 17 | r17 = 333.253 | d17 = 0.50 | n9 = 1.805181 | v9 = 25.46 |
| 18 | r18 = 4.519 | d18 = 2.05 | n10 = 1.568829 | v10 = 56.04 |
| 19 | r19 = −41.266 | d19 = 7.10 | | |
| 20 | r20 = INFINITY | d20 = 0.38 | n11 = 1.552320 | v11 = 63.42 |
| 21 | r21 = INFINITY | d21 = 1.84 | | |
| 22 | r22 = INFINITY | d22 = 0.50 | n12 = 1.516798 | v12 = 64.20 |
| 23 | r23 = INFINITY | d23 = 0.99 | | |
| 24 | r24 = INFINITY | | | Image Surface (IMG) |

In the zoom lens 2, both of the surfaces of lens L2 (s5 and s6), the surface of the lens L6 on the object side (s13), and the surface of the lens L7 on the image side (s16) are formed into aspherical surfaces. In Table 6, respective 4th-order, 6th-order, 8th-order, and 10th-order aspherical surface coefficients C4, C6, C8 and C10 in the respective surfaces s5, s6, s13 and s16 are shown together with their conic constants κ.

TABLE 6

| si | κ | C4 | C6 | C8 | C10 |
|---|---|---|---|---|---|
| 5 | 0 | −.111276E−03 | 0.000000E+00 | 0.000000E+00 | 0.000000E+00 |
| 6 | 0 | 0.249131E−05 | −.592313E−06 | 0.730325E−07 | −.183715E−08 |
| 13 | 0 | −.305020E−03 | −.248110E−05 | 0.247976E−06 | −.152147E−07 |
| 16 | 0 | 0.334075E−03 | −.362803E−05 | 0.369631E−06 | −.180932E−07 |

In the numeric value example 2, similar to the numeric value example 1, by forming into aspherical surfaces both of the surfaces of the lens L2 in the first lens group GR1 (s5 and s6), distortion aberration is corrected and the prism P is downsized. Furthermore, by forming the cementing surfaces of the cemented lenses (lens L9 and Lens L10) used in the fifth lens group GR5 into a convex surface on the object side, chromatic aberration is favorably corrected.

Figure 6:
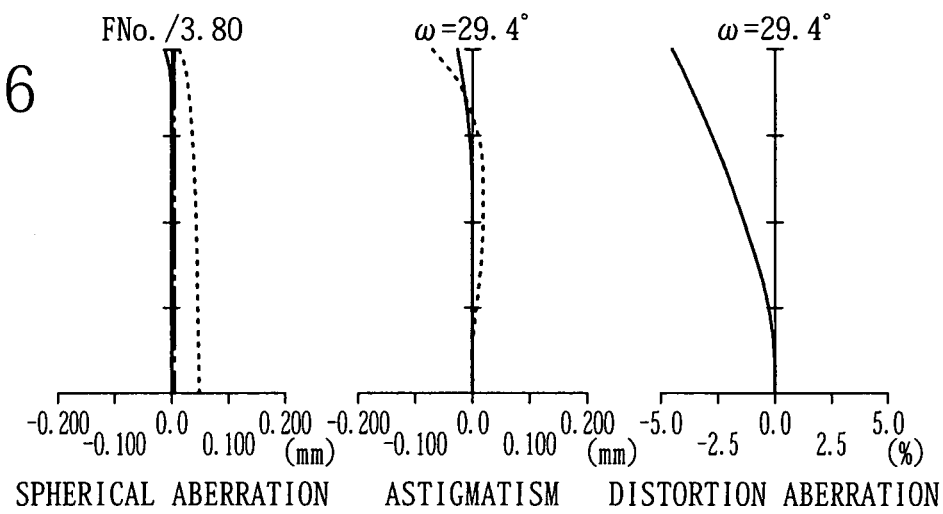
FIG. 6 is charts showing spherical aberration, astigmatism and distortion aberration of a numeric value example 2 applying concrete numeric values to the second embodiment together with FIGS. 7 and 8, in which these aberrations at a short focal distance end are shown.
Figure 7:
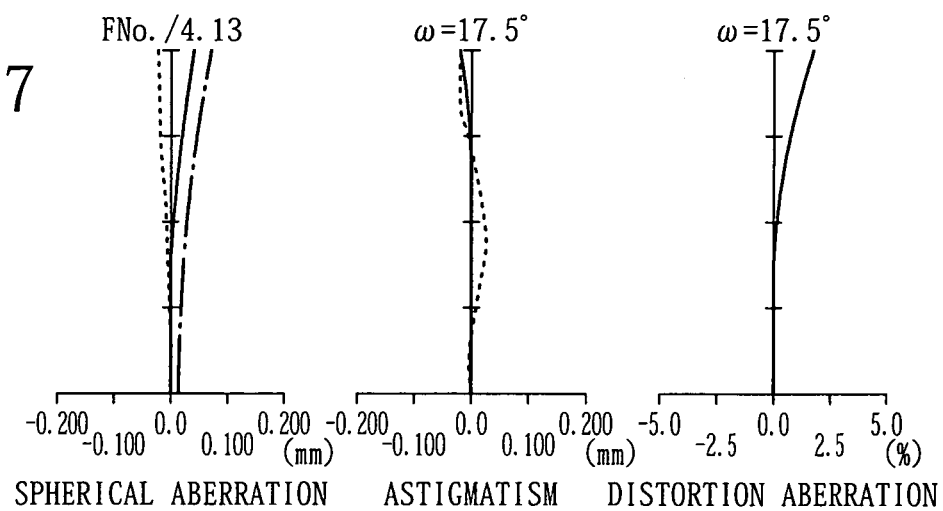
FIG. 7 is charts showing spherical aberration, astigmatism and distortion aberration at an intermediate focal distance between the short focal distance end and a long focal distance end.
Figure 8:
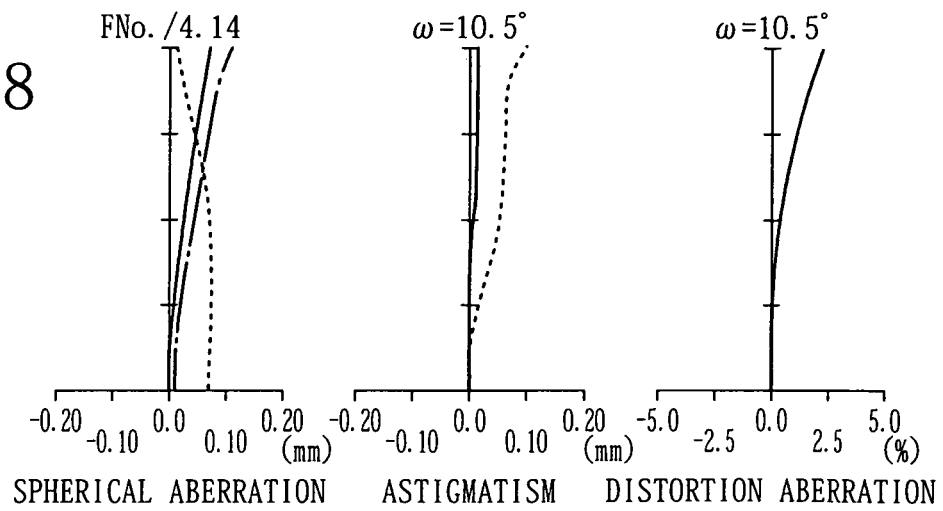
FIG. 8 is charts showing spherical aberration, astigmatism and distortion aberration at the long focal distance end.

FIGS. 6 to 8 are graphs showing various aberrations at the short focal distance end, at the intermediate focal distance, and at the long focal distance end. In each of the figures, a graph (A) shows spherical aberration, a graph (B) shows astigmatism, and a graph (C) shows distortion aberration.

Figure 9:
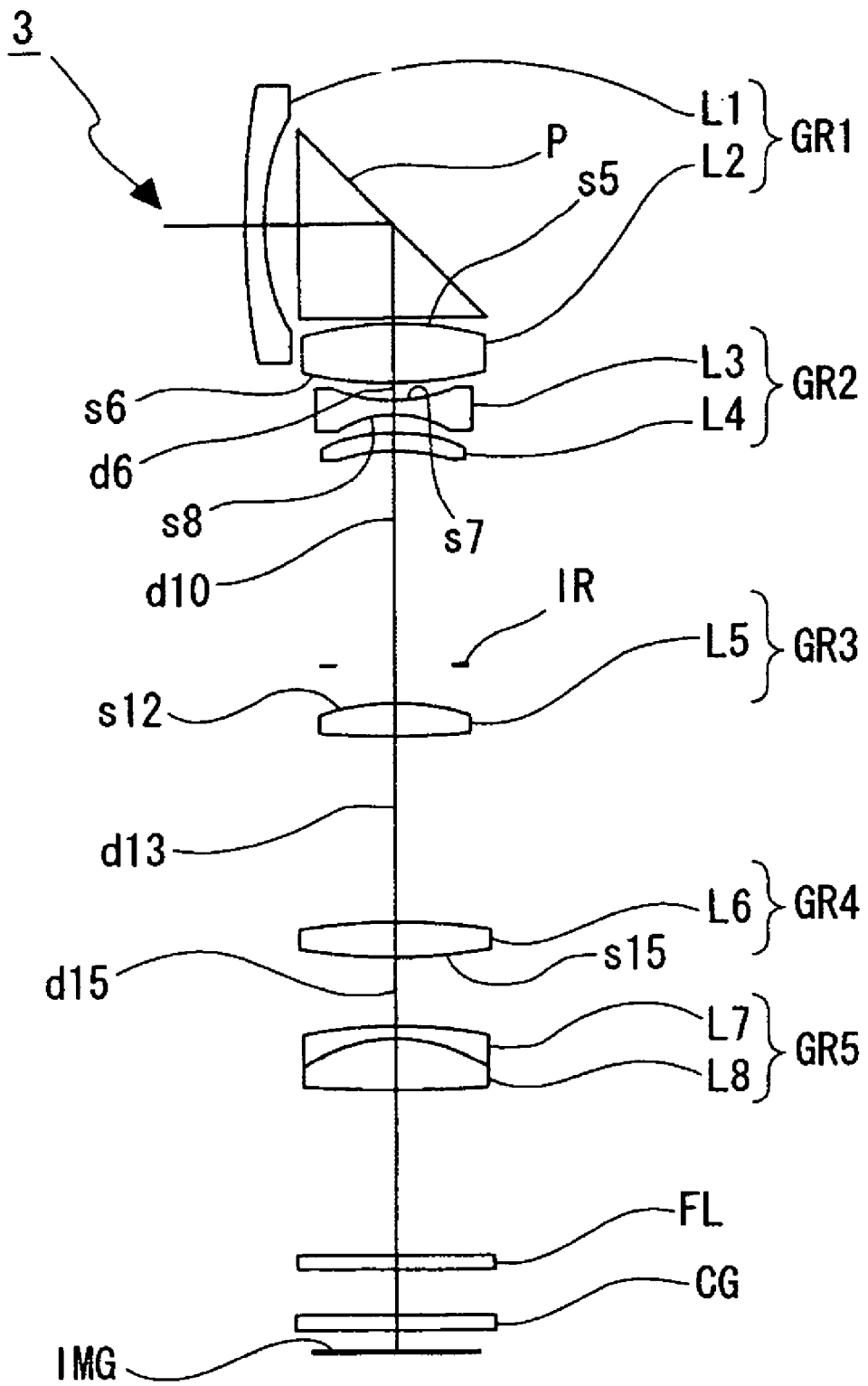
FIG. 9 is a view showing a third embodiment of the zoom lens of the present invention together with FIGS. 10 to 12, in which a lens constitution is illustrated.

FIGS. 9 to 12 show a third embodiment of the zoom lens of the present invention. FIG. 9 is a view showing a lens constitution of a zoom lens 3 according to the third embodiment. This zoom lens 3 also is used as an image pick-up lens for an image pick-up apparatus such as a digital still camera, for example.

In the zoom lens 3, there are arranged a first lens group GR1 having positive refractive power, a second lens group GR2 having negative refractive power, a third lens group GR3 having positive refractive power, a fourth lens group GR4 having positive refractive power and a fifth lens group GR5 having negative refractive power in order from the object side to the image surface IMG side. Furthermore, on the object side of the third lens group GR3, an iris IR adjusting an amount of light is arranged, and on the image surface IMG side of the fifth lens group GR5, a filter FL made of a low-pass filter or the like, such as an infrared ray cut filter, and a cover glass CG of the image pick-up device are arranged. The image surface IMG is a light receiving surface of the image pick-up device such as a CCD (Charge Coupled Device), for example.

This zoom lens 3 is constituted so as to move the second lens group GR2 and the fourth lens group GR4 for zooming. When the zooming from a short focal distance end to a long focal distance end is performed, the second lens group GR2 is moved from the object side to the image surface IMG side, and the fourth lens group GR4 is moved from the image surface IMG side to the object side, respectively. Furthermore, a so-called rear focus system is employed for this zoom lens 3 and thus moving the fourth lens group GR4 or the fifth lens group GR5 enables focusing.

Furthermore, the first lens group GR1 is composed of one lens L1 having negative refractive power, a prism P for refracting a light path, and one lens L2 having positive refractive power in order from the object side. Accordingly, a moving direction of the lenses moved at the time of zooming and focusing is an optical axis direction of the lens L2, different from an optical axis direction of the lens L1 that is the closest to the object. In the present embodiment, the lens L1 is made of a meniscus lens formed into a convex shape toward the object side, and the lens L2 is made of a both surface aspherical lens in which both lens surfaces are formed into a convex shape.

Furthermore, the second lens group GR2 is composed of lenses L3 and L4 arranged in order from the object side. The third lens group GR3 is composed of one lens L5. The fourth lens group GR4 is composed of one lens L6. Furthermore, the fifth lens group GR5 is composed of two lenses L7 and L8, and lens surfaces between the lens L7 and the lens L8 are cemented. The lens L3 is a plastic lens in which both surfaces are aspherical surfaces, the lens L5 is a plastic lens whose surface on the object side is an aspherical surface, and the lens L6 is a plastic lens whose surface on the image surface side is an aspherical surface.

Table 7 shows respective numeric values of a numeric value example 3 applying concrete numeric values to the zoom lens 3 according to the third embodiment.

TABLE 7

| si | ri | di | ni | vi |
|---|---|---|---|---|
| 1 | r1 = 32.085 | d1 = 0.65 | n1 = 1.922860 | v1 = 20.88 |
| 2 | r2 = 8.872 | d2 = 1.40 | | |
| 3 | r3 = INFINITY | d3 = 7.00 | n2 = 1.846663 | v2 = 23.78 |
| 4 | r4 = INFINITY | d4 = 0.30 | | |
| 5 | r5 = 12.622(ASP) | d5 = 2.26 | n3 = 1.693500 | v3 = 53.20 |
| 6 | r6 = −16.623(ASP) | d6 = variable | | |
| 7 | r7 = −8.395(ASP) | d7 = 0.60 | n4 = 1.524700 | v4 = 56.24 |
| 8 | r8 = 3.930(ASP) | d8 = 0.61 | | |
| 9 | r9 = 6.466 | d9 = 0.84 | n5 = 1.922860 | v5 = 20.88 |
| 10 | r10 = 9.034 | d10 = variable | | |
| 11 | r11 = INFINITY | d11 = 1.50 | | Aperture Stop |
| 12 | r12 = 9.544(ASP) | d12 = 1.18 | n6 = 1.524700 | v6 = 56.24 |
| 13 | r13 = −35.584 | d13 = variable | | |
| 14 | r14 = 19.436 | d14 = 1.25 | n7 = 1.524700 | v7 = 56.24 |
| 15 | r15 = −22.981(ASP) | d15 = variable | | |
| 16 | r16 = 17.908 | d16 = 0.50 | n8 = 1.922860 | v8 = 20.88 |
| 17 | r17 = 5.504 | d17 = 1.97 | n9 = 1.516798 | v9 = 64.20 |
| 18 | r18 = −37.924 | d18 = 6.63 | | |
| 19 | r19 = INFINITY | d19 = 0.38 | n10 = 1.552320 | v10 = 63.42 |
| 20 | r20 = INFINITY | d20 = 1.84 | | |
| 21 | r21 = INFINITY | d21 = 0.50 | n11 = 1.516798 | v11 = 64.20 |
| 22 | r22 = INFINITY | d22 = 0.99 | | |
| 23 | r23 = INFINITY | | | Image Surface (IMG) |

In the zoom lens 3, during zooming, a surface distance d6 between the first lens group GR1 and the second lens group GR2, a surface distance d10 between the second lens group GR2 and the iris IR, a surface distance d13 between the third lens group GR3 and the fourth lens group GR4, and a surface distance d15 between the fourth lens group GR4 and the fifth lens group GR5 are variable. In Table 8, respective values of the respective surface distances d6, d10, d13 and d15 at the short focal distance end, at an intermediate focal distance between the short focal distance end and the long focal distance end, and at the long focal distance end according to the third numeric value example 3 are shown together with focal distances, F numbers and half angles of field ω (degree).

TABLE 8

| | Focal Distance | | |
|---|---|---|---|
| | 6.18 | 10.40 | 17.49 |
| F Number | 3.80 | 4.06 | 4.43 |
| ω (degree) | 29.6 | 17.5 | 10.5 |
| d6 | 0.65 | 4.58 | 7.76 |
| d10 | 8.11 | 4.18 | 1.00 |
| d13 | 7.36 | 4.63 | 2.20 |
| d15 | 2.78 | 5.51 | 7.94 |

In the zoom lens 3, both of the surfaces of lens L2 (s5 and s6), both of the surfaces of the lens L3 (s7, s8), the surface of the lens L5 on the object side (s12), and the surface of the lens L6 on the image surface side (s15) are formed into aspherical surfaces. In Table 9, respective 4th-order, 6th-order, 8th-order, and 10th-order aspherical surface coefficients C4, C6, C8 and C10 in the respective surfaces s5, s6, s7, s8, s12 and s15 are shown together with their conic constants κ.

TABLE 9

| si | κ | C4 | C6 | C8 | C10 |
|---|---|---|---|---|---|
| 5 | 0 | −.111187E−03 | 0.000000E+00 | 0.000000E+00 | 0.000000E+00 |
| 6 | 0 | −.132288E−05 | −.880579E−06 | 0.828097E−07 | −.200010E−12 |
| 7 | 0 | −.110126E−02 | 0.324871E−03 | −.320597E−04 | 0.137024E−05 |
| 8 | 0 | −.392627E−02 | 0.333569E−03 | −.483612E−04 | 0.254223E−05 |
| 12 | 0 | −.291258E−03 | −.463126E−06 | 0.128598E−06 | 0.922757E−08 |
| 15 | 0 | 0.185663E−03 | −.173893E−05 | 0.263855E−06 | −.112370E−07 |

In the numeric value example 3, similar to the numeric value example 1, by forming into aspherical surfaces both of the surfaces of the lens L2 in the first lens group GR1 (s5 and s6), distortion aberration is corrected and the prism P is downsized. Furthermore, in the fifth lens group GR5, by forming the cementing surfaces of the cemented lenses (lens L7 and Lens L8) into a convex surface on the object side, chromatic aberration is corrected.

Furthermore, the lens L3, the lens L5 and the lens L6 are made of plastic molded materials, and at least one negative lens and at least one positive lens are both plastic, thereby canceling characteristic variation due to temperature variation and exerting more effects.

Figure 10:
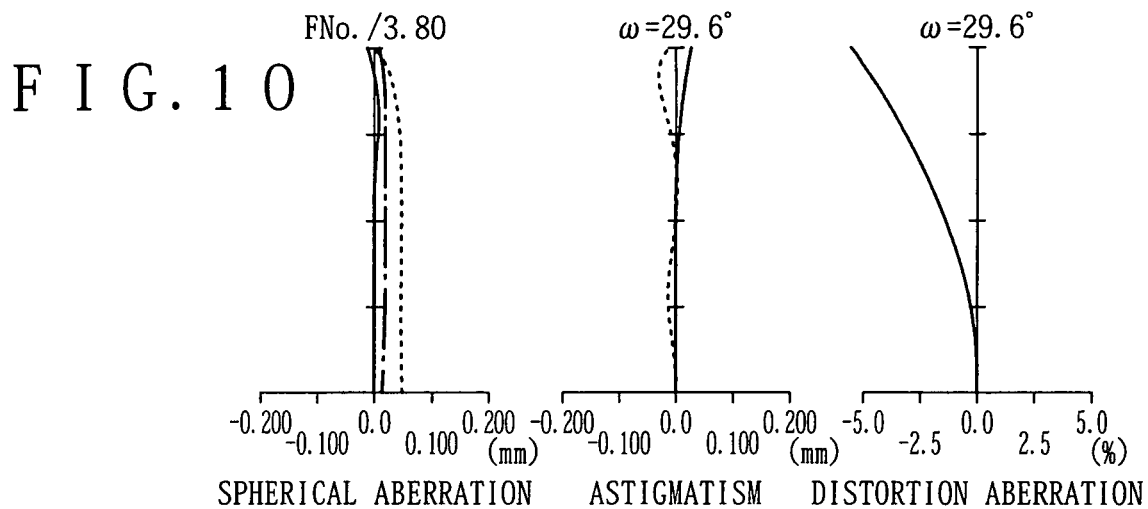
FIG. 10 is charts showing spherical aberration, astigmatism and distortion aberration of a numeric value example 3 applying concrete numeric values to the third embodiment together with FIGS. 11 and 12, in which these aberrations at a short focal distance end are shown.
Figure 11:
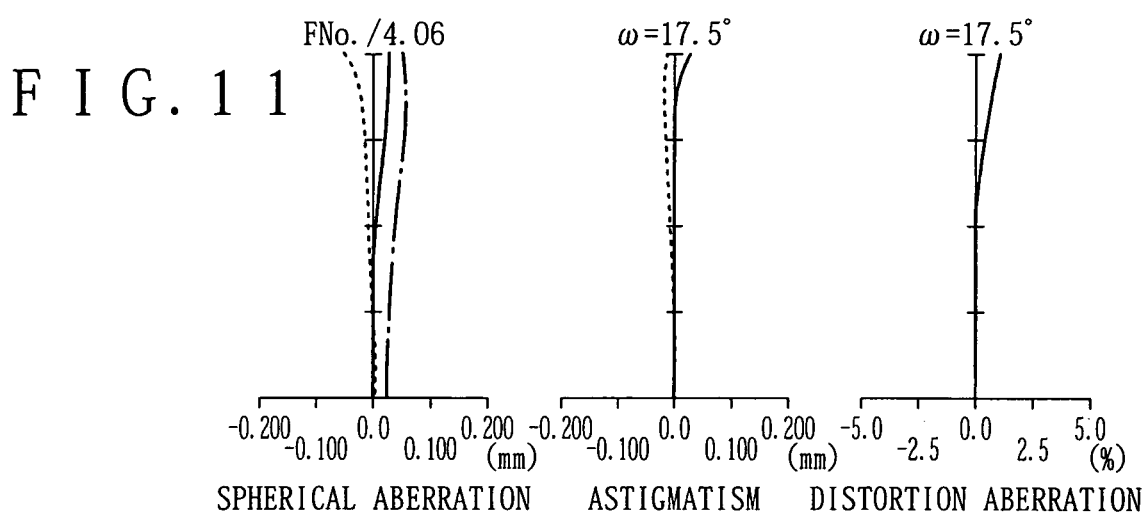
FIG. 11 is charts showing spherical aberration, astigmatism and distortion aberration at an intermediate focal distance between the short focal distance end and a long focal distance end.
Figure 12:
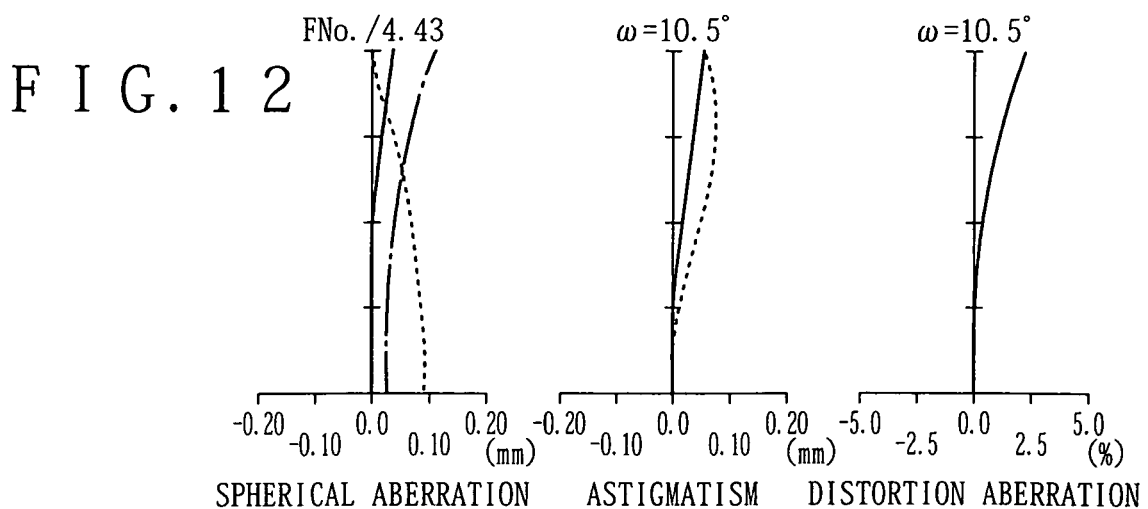
FIG. 12 is charts showing spherical aberration, astigmatism and distortion aberration at the long focal distance end.

FIGS. 10 to 12 are graphs showing various aberrations at the short focal distance end, at the intermediate focal distance, and at the long focal distance end. In each of the figures, a graph (A) shows spherical aberration, a graph (B) shows astigmatism, and a graph (C) shows distortion aberration.

Table 10 shows values corresponding to the above-described conditional formulae in the numeric value examples 1 to 3.

TABLE 10

| Conditional Formula | Numeric Value Example 1 | Numeric Value Example 2 | Numeric Value Example 3 |
|---|---|---|---|
| (1) β 5 | 1.58 | 1.44 | 1.10 |
| (2) \|dZ2/dZ4\| | 0.88 | 1.76 | 1.00 |

TABLE 10-continued

| Conditional Formula | Numeric Value Example 1 | Numeric Value Example 2 | Numeric Value Example 3 |
|---|---|---|---|
| (3) neL1 | 1.922860 | 1.846663 | 1.922860 |
| (3) veL1 | 20.88 | 23.78 | 20.88 |

Figure 14:
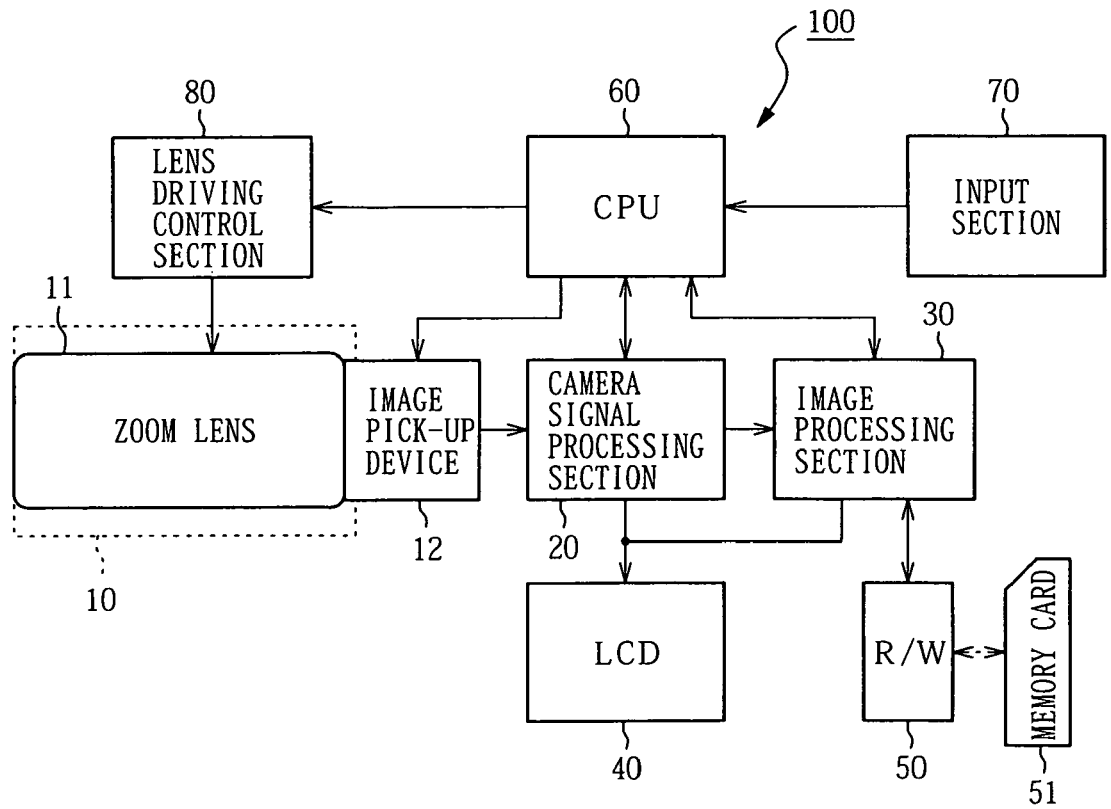
FIG. 14 is a constitutional block diagram.

Now, an example of an image pick-up apparatus using the above-described zoom lens is described. FIG. 14 is a block view showing a constitutional example of a digital still camera capable of mounting the zoom lens of the present invention.

A digital still camera 100, as shown in FIG. 14, includes a camera block 10 having an image pick-up function, a camera signal processing section 20 performing signal processing such as analog-digital conversion of a picked-up image signal, an image processing section 30 performing record reproducing processing of the image signal, a LCD (Liquid Crystal Display) 40 displaying the picked-up image and the like, a R/W (reader and writer 50) performing write/read with respect to a memory card 51, a CPU 60 controlling the whole apparatus, an input section 70 for operation input by a user, and a lens driving control section 80 controlling drive of the lens within the camera block 10.

The camera block 10 is composed of an optical system including a zoom lens 11 to which the present invention is applied (the above-described zoom lenses 1 to 3 can be used), an image pick-up device 12, such as a CCD and the like. The camera signal processing section 20 performs signal processing, such as conversion of an output signal from the image pick-up device 12 to a digital signal, noise removal, image quality correction, and conversion to luminance and color difference signals. The image processing section 30 performs compression and coding/extension and decoding processing of the image signal based on a predetermined image data format, conversion processing of data specification such as resolution, and the like.

The memory card 51 is made of a detachable semiconductor memory. The R/W 50 writes the image data coded by the image processing section 30 into the memory card 51, and the image data recorded on the memory card 51 are read out. The CPU 60 is a control processing section controlling the respective circuit blocks within the digital still camera, which controls the respective circuit blocks based on an instruction input signal from the input section 70 and the like.

The input section 70 is composed of, for example, a shutter release button for performing shutter operation, a selection switch for selecting an operation mode and the like. The input section 70 outputs an instruction input signal according to operation by the user to the CPU 60. The lens driving control section 80 controls a motor driving the lenses within the zoom lens 11, which is not shown in the figure, and the like based on a control signal from the CPU 60.

Hereinafter, the operation of this digital still camera is described briefly.

In a standby state of photographing, under the control of the CPU 60, an image signal picked up in the camera block 10 is outputted to the LCD 40 via the camera signal processing section 20 to be displayed as a camera through image. Furthermore, when an instruction input signal for zooming is inputted from the input section 70, the CPU 60 outputs a control signal to the lens driving control section 80 to move a predetermined lens within the zoom lens 11 based on the control of the lens driving control section 80.

Then, when a shutter (not shown in the figure) in the camera block 10 is released by the instruction input signal from the input section 70, a picked-up image signal is outputted from the camera signal processing section 20 to the image processing section 30 to be subjected to the compression and coding processing and e converted into digital data in a predetermined data format. The converted data are output to the R/W 50 to be written into the memory card 51.

Focusing is performed by the lens driving control section 80 moving a predetermined lens within the zoom lens 11 based on the control signal from the CPU 60, for example, in the case where the shutter release button is half pressed or fully pressed for recording, etc.

Furthermore, when image data recorded on the memory card 51 is reproduced, the predetermined image data are read out from the memory card 51 by the R/W 50 according to the operation by the input section 70 and are subjected to extension and decoding processing in the image processing section 30, and then the reproduction image signal is outputted to the LCD 40. This allows the reproduction image to be displayed.

Figure 13:
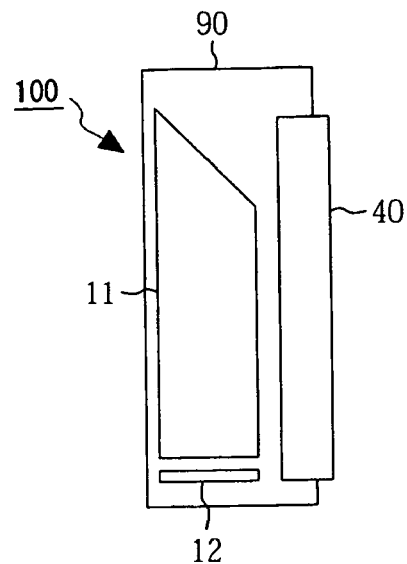
FIG. 13 is a view showing an embodiment of an image pick-up apparatus of the present invention together with FIG. 14, in which an example of an arrangement structure inside a camera housing is illustrated.

FIG. 13 shows the interior of the digital still camera in the case where an object is on the left side in the figure. The zoom lens 11 is housed inside a camera housing 90, below which the image pick-up device 12 is provided. Furthermore, the LCD 40 is provided in a camera housing 90 surface on the side opposed to the object and is used to match the angle of view at the time of photographing.

The zoom lens of the present invention refracts the optical axis of light from the object by the prism and the predetermined lens is moved along the refractive direction (vertical direction in the figure), which enables zooming and focusing. Accordingly, photographing can be performed without projecting the zoom lens 11 from the camera housing 90, and thus a depth of a camera body at the time of photographing is reduced. In addition, the zoom lens 11 is designed to satisfy the above-described conditions, which can further reduce the camera housing 90 in thickness and downsize it in the vertical direction. Consequently, in spite of being compact, the zooming of about 3× to 5× is enabled and a high quality picked-up image with less aberration at various focal distances can be attained.

Furthermore, by moving the whole configured zoom groups or a part thereof in the direction perpendicular to the optical axis, the movement of the image due to camera shaking can also be corrected.

While in the above-described embodiment the case where the image pick-up apparatus is applied to the digital still camera is described, it also can be applied to another image pick-up apparatus or the like, such as a video camera, for example.

The concrete shapes, constitutions and numeric values of the respective parts shown in the respective embodiments and the respective numeric value examples are merely examples of the embodiments performed when the present invention is carried out. The technical scope of the present invention should not be construed restrictively.

It is preferable to apply the present invention to an image pick-up apparatus, such as a video camera and a digital still camera, to which downsizing and high performance are required.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
    a first lens group having positive refractive power;
    a second lens group having negative refractive power;
    a third lens group having positive refractive power;
    a fourth lens group having positive refractive power; and
    a fifth lens group having negative refractive power;
    which are arranged in order from an object side, said zoom lens being configured to perform zooming by moving said second lens group and said fourth lens group;
    wherein said first lens group includes a front lens group having negative refractive power, an optical member refracting a light path, and a rear lens group having positive refractive power, which are arranged in order from the object side,
    wherein said fourth lens group includes one single lens, and
    wherein if image forming power of said fifth lens group at an object distance of infinity is set to be β5, the following conditional formula is satisfied:

$1.0<\beta5<1.8$ and wherein zooming from the short focal distance side to the long focal distance side is performed by moving said second lens group from the object side to the image surface side and moving said fourth lens group from the image surface side to the object side, and
    wherein if a stroke of said second lens group from a short focal distance end to a long focal distance end is set to be dZ2, and a stroke of said fourth lens group from the short focal distance end to the long focal distance end at the object distance of infinity is set to be dZ4, the following conditional formula is satisfied:

$0.6<|dZ2/dZ4|<2.0$.

2. The zoom lens as described in claim 1:
    wherein in said first lens group, said front lens group includes one meniscus lens having negative refractive power which is formed into a convex shape toward the object side, said optical member includes a prism, and said rear lens group includes one lens in which both surface thereof are convex surfaces, and
    wherein if a refractive index of said meniscus lens composing said front lens group with respect to a line d is set to be ndL1, and an Abbe number with reference to the line d is set to be vdL1, the following conditional formulae are satisfied:

$ndL1>1.8$ $vdL1<30$.

3. The zoom lens as described in claim 2:
    wherein at least one negative lens in said second lens group, and at least one positive lens in said third lens group and said fourth lens group are made of plastic lenses.

4. The zoom lens as described in claim 1:
wherein at least one negative lens in said second lens group, and at least one positive lens in said third lens group and said fourth lens group are made of plastic lenses.

5. An image pick-up apparatus using as an image pick-up lens a zoom lens, said zoom lens as set forth in claim 1:
a first lens group having positive refractive power;
a second lens group having negative refractive power;
a third lens group having positive refractive power;
a fourth lens group having positive refractive power; and
a fifth lens group having negative refractive power;
which are arranged in order from an object side, said zoom lens being configured to perform zooming by moving said second lens group and said fourth lens group;
wherein said fourth lens group includes one single lens, and
wherein if image forming power of said fifth lens group at an object distance of infinity is set to be β5, the following conditional formula (1) is satisfied:

$$1.0<\beta 5<1.8]. \tag{1}$$

6. A zoom lens comprising:
a first lens group having positive refractive power;
a second lens group having negative refractive power;
a third lens group having positive refractive power;
a fourth lens group having positive refractive power; and
a fifth lens group having negative refractive power;
which are arranged in order from an object side, said zoom lens being configured to perform zooming by moving said second lens group and said fourth lens group;
wherein said first lens group includes a front lens group having negative refractive power, an optical member refracting a light path, and a rear lens group having positive refractive power, which are arranged in order from the object side,
wherein said fourth lens group includes one single lens, and
wherein if image forming power of said fifth lens group at an object distance of infinity is set to be β5, the following conditional formula (1) is satisfied:

$$1.0<\beta 5<1.8; \tag{1}$$

wherein in said first lens group, said front lens group includes one meniscus lens having negative refractive power which is formed into a convex shape toward the object side, said optical member includes a prism, and said rear lens group includes one lens in which both surface thereof are convex surfaces, and
wherein if a refractive index of said meniscus lens composing said front lens group with respect to a line d is set to be ndL1, and an Abbe number with reference to the line d is set to be vdL1, the following conditional formulae (2) and (3) are satisfied:

$$ndL1>1.8 \tag{2}$$

$$vdL1<30; \tag{3}$$

and, wherein zooming from the short focal distance side to the long focal distance side is performed by moving said second lens group from the object side to the image surface side and moving said fourth lens group from the image surface side to the object side, and
wherein if a stroke of said second lens group from a short focal distance end to a long focal distance end is set to be dZ2, and a stroke of said fourth lens group from the short focal distance end to the long focal distance end at the object distance of infinity is set to be dZ4, the following conditional formula (4) is satisfied:

$$0.6<|dZ2/dZ4|<2.0. \tag{4}$$

7. The zoom lens as described in claim 6
wherein at least one negative lens in said second lens group, and at least one positive lens in said third lens group and said fourth lens group are made of plastic lenses.

8. A zoom lens comprising:
a first lens group having positive refractive power;
a second lens group having negative refractive power;
a third lens group having positive refractive power;
a fourth lens group having positive refractive power; and
a fifth lens group having negative refractive power;
which are arranged in order from an object side, said zoom lens being configured to perform zooming by moving said second lens group and said fourth lens group;
wherein said first lens group includes a front lens group having negative refractive power, an optical member refracting a light path, and a rear lens group having positive refractive power, which are arranged in order from the object side,
wherein said fourth lens group includes one single lens, and
wherein if image forming power of said fifth lens group at an object distance of infinity is set to be β5, the following conditional formula is satisfied:

$$1.0<\beta 5<1.8$$

wherein in said first lens group, said front lens group includes one meniscus lens having negative refractive power which is formed into a convex shape toward the object side, said optical member includes a prism, and said rear lens group includes one lens in which both surface thereof are convex surfaces, and
wherein if a refractive index of said meniscus lens composing said front lens group with respect to a line d is set to be ndL1, and an Abbe number with reference to the line d is set to be vdL1, the following conditional formulae are satisfied:

$$ndL1>1.8$$

$$vdL1<30$$

wherein at least one negative lens in said second lens group, and at least one positive lens in said third lens group and said fourth lens group are made of plastic lenses, and
wherein zooming from the short focal distance side to the long focal distance side is performed by moving said second lens group from the object side to the image surface side and moving said fourth lens group from the image surface side to the object side, and
wherein if a stroke of said second lens group from a short focal distance end to a lone focal distance end is set to be dZ2, and a stroke of said fourth lens group from the short focal distance end to the long focal distance end at the object distance of infinity is set to be dZ4, the following conditional formula is satisfied:

$$0.6<|dZ2/dZ4|<2.0.$$

* * * * *